(12) United States Patent
Hrupp et al.

(10) Patent No.: US 11,719,068 B2
(45) Date of Patent: *Aug. 8, 2023

(54) STRADDLE PACKER WITH FLUID PRESSURE PACKER SET AND VELOCITY BYPASS FOR PROPANT-LADEN FRACTURING FLUIDS

(71) Applicant: Exacta-Frac Energy Services, Inc., Conroe, TX (US)

(72) Inventors: Joze John Hrupp, Montgomery, TX (US); Ahmed Mohamed Saeed, Cypress, TX (US)

(73) Assignee: EXACTA-FRAC ENERGY SERVICES, INC., Conroe, TX (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/313,568

(22) Filed: May 6, 2021

(65) Prior Publication Data

US 2021/0256340 A1 Aug. 19, 2021

Related U.S. Application Data

(63) Continuation-in-part of application No. 15/941,967, filed on Mar. 30, 2018, now abandoned, which is a continuation of application No. 16/456,021, filed on Jun. 28, 2019, now Pat. No. 11,037,040.

(51) Int. Cl.
*E21B 33/124* (2006.01)
*G06K 19/07* (2006.01)

(52) U.S. Cl.
CPC ........ *E21B 33/124* (2013.01); *G06K 19/0723* (2013.01)

(58) Field of Classification Search
CPC .............................. E21B 43/02; E21B 33/124
See application file for complete search history.

(56) References Cited

U.S. PATENT DOCUMENTS

| | | |
|---|---|---|
| 2,624,412 A | 1/1953 | Ragan |
| 2,769,497 A | 11/1956 | Reistie, Jr. |
| 2,927,638 A | 3/1960 | Hall, Sr. |
| 3,090,436 A | 5/1963 | Briggs, Jr. |
| 3,160,209 A | 12/1964 | Bonner |
| 4,487,258 A | 12/1984 | Jackson et al. |
| 5,152,340 A | 10/1992 | Clark et al. |
| 5,383,520 A | 1/1995 | Tucker et al. |
| 5,803,177 A | 9/1998 | Hriscu et al. |
| 5,810,082 A | 9/1998 | Jordan, Jr. |
| 5,890,540 A | 4/1999 | Pia et al. |
| 5,904,207 A | 5/1999 | Rubbo et al. |

(Continued)

OTHER PUBLICATIONS

Requisition by Canadian Examiner dated Jan. 28, 2021 which issued against Canadian application 3,064,447, which claims priority from U.S. Appl. No. 16/456,021—3 pages.

*Primary Examiner* — Kristyn A Hall
(74) *Attorney, Agent, or Firm* — JK Intellectual Property Law, PA

(57) ABSTRACT

A straddle packer for proppant-laden fracturing fluids has a slotted frac sub with a proppant filtration plug body that excludes proppant in the fracturing fluid from a central passage of the straddle packer downhole from the slotted frac hub. Pressure equalization sleeve filters exclude an entry of debris in a well bore through pressure equalization ports of the straddle packer.

20 Claims, 5 Drawing Sheets

(56) References Cited

U.S. PATENT DOCUMENTS

| | | | |
|---|---|---|---|
| 6,253,856 B1 | 7/2001 | Ingram et al. | |
| 6,484,805 B1 | 11/2002 | Perkins et al. | |
| 6,564,876 B2 | 5/2003 | Vaynshteyn et al. | |
| 6,776,239 B2 | 8/2004 | Eisinger et al. | |
| 6,832,654 B2* | 12/2004 | Ravensbergen | E21B 34/063 |
| | | | 166/308.1 |
| 7,341,111 B2 | 3/2008 | Van et al. | |
| 7,377,834 B2 | 3/2008 | Surjaatmadja et al. | |
| 7,500,526 B2 | 3/2009 | Telfer | |
| 7,789,163 B2 | 9/2010 | Kratochvil et al. | |
| 8,201,631 B2 | 6/2012 | Stromquist et al. | |
| 8,336,615 B2 | 12/2012 | Hughes et al. | |
| 8,490,702 B2 | 7/2013 | Stromquist et al. | |
| 8,950,505 B2 | 2/2015 | Themig et al. | |
| 9,016,390 B2 | 4/2015 | Stewart et al. | |
| 9,334,714 B2 | 5/2016 | Stromquist et al. | |
| 9,580,990 B2 | 2/2017 | Flores et al. | |
| 9,598,939 B2 | 3/2017 | Lee | |
| 11,037,040 B2* | 6/2021 | Hrupp | E21B 33/124 |
| 2005/0016727 A1* | 1/2005 | Fields | E21B 49/06 |
| | | | 166/298 |
| 2005/0016737 A1 | 1/2005 | Fields | |
| 2005/0077053 A1 | 4/2005 | Walker et al. | |
| 2007/0034370 A1 | 2/2007 | Moyes | |
| 2008/0011471 A1 | 1/2008 | Hughes et al. | |
| 2015/0376979 A1 | 12/2015 | Mitchell et al. | |
| 2016/0369585 A1 | 12/2016 | Limb et al. | |

* cited by examiner

STRADDLE PACKER WITH FLUID PRESSURE PACKER SET AND VELOCITY BYPASS FOR PROPANT-LADEN FRACTURING FLUIDS

CROSS REFERENCE TO RELATED APPLICATIONS

This is a continuation of Applicant's U.S. patent application Ser. No. 16/456,021 filed on 28 Jun. 2019, which was a continuation-in-part of Applicant's U.S. patent application Ser. No. 15/961,947 filed on 25 Apr. 2018 which claimed priority from Applicant's U.S. provisional patent application 62/608,707 filed on 21 Dec. 2017.

FIELD OF THE INVENTION

This invention relates in general to precision fracking systems and, in particular, to a novel straddle packer with fluid pressure packer set and velocity bypass for proppant-laden fracturing fluids used for cased wellbore or open hole well stimulation or remediation.

BACKGROUND OF THE INVENTION

Wellbore pressure isolation tools, commonly referred to as "straddle packers", are known and used to pressure isolate a downhole area of interest in a cased or open hydrocarbon wellbore for the purpose of what is known as focused or precision well stimulation or remediation. Straddle packers designed for this purpose are well known, but their use has been associated with operational issues that frequently render them unreliable. In addition, many straddle packers are set and unset using work string manipulations controlled at the surface. However, controlled work string manipulation becomes difficult, if not impossible, in the very long lateral bores that are common now. This is due to the frictional drag on the work string that results from the inherent corkscrew character of those very long lateral bores. Furthermore, hydrocarbon well completion and re-completion work frequently requires the placement of large quantities of heavily proppant-laden stimulation fluids. Those fluids tend to cause "wash" and/or "screen out" in a straddle packer. Most straddle packers are poorly designed to resist proppant wash or recover from proppant screen out.

There therefore exists a need for a novel straddle packer with fluid pressure packer set and velocity bypass, for proppant-laden fracturing fluids that overcomes the operational issues associated with known prior art straddle packers.

SUMMARY OF THE INVENTION

It is therefore an object of the invention to provide a long-reach straddle packer with fluid pressure packer set and velocity bypass for proppant-laden fracturing fluids.

The invention therefore provides a straddle packer with fluid pressure packer set for proppant-laden fracturing fluids, comprising a proppant filtration plug body that occludes a central passage of the straddle packer down hole of radial fluid paths through a frac sub of the straddle packer and uphole of fluid ports of a compression cylinder of the straddle packer, the proppant filtration plug body excluding solid components of high-pressure fluid pumped into the central passage while permitting fluid components of the high-pressure fluid to flow therethrough.

The invention further provides a straddle packer with fluid pressure packer set for proppant-laden fracturing fluids, comprising a slotted frac hub having a central passage and at least one frac hub slot in fluid communication with the central passage, the slotted frac hub supporting a proppant filtration plug body that occludes the central passage downhole of the at least one frac hub slot, the proppant filtration plug body excluding solid components of high-pressure fluid pumped into the straddle packer from a central passage of the straddle packer downhole of the slotted frac hub, while permitting fluid components of the high-pressure fluid to flow therethrough.

BRIEF DESCRIPTION OF THE DRAWINGS

Having thus generally described the nature of the invention, reference will now be made to the accompanying drawings, in which:

FIG. 6b is an end view of the proppant filter body shown in FIG. 6a;

FIG. 8B is a cross-sectional view of the sleeve filter shown in FIG. 8a;

FIG. 9b is a cross-sectional view of the sleeve filter shown in FIG. 9a.

DETAILED DESCRIPTION OF THE PREFERRED EMBODIMENTS

Figure 1:
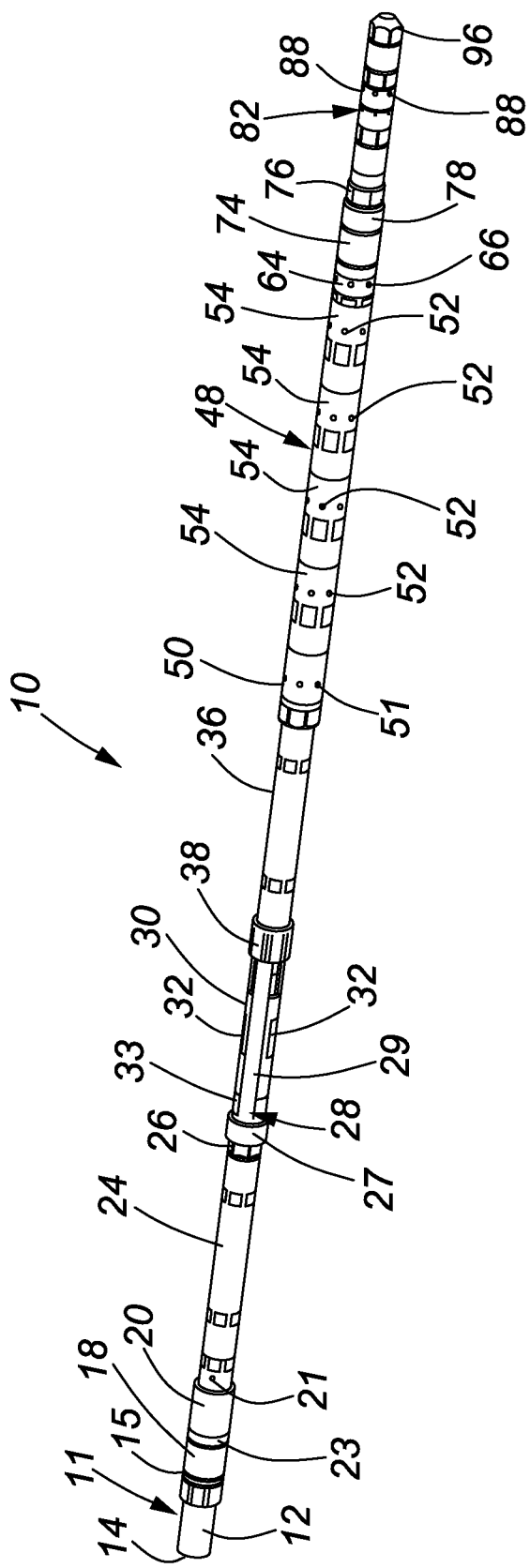
FIG. 1 is a perspective view of an embodiment of a long-reach straddle packer with fluid pressure packer set and velocity bypass for proppant-laden fracturing fluids in accordance with the invention in a run-in condition.

The invention provides a long-reach straddle packer with fluid pressure packer set and velocity bypass for proppant-laden fracturing fluids designed to be used in precision well stimulation or remediation treatments in either open hole or cased wellbores (hereinafter referred to collectively as "wellbores"). The straddle packer has spaced-apart upper and lower packer elements that bracket a slotted frac hub component of a multicomponent mandrel that extends from an upper end to a lower end of the straddle packer. In one embodiment, the slotted frac hub has at least one slot used to inject proppant-laden well stimulation or well remediation fluid (hereinafter referred to collectively as "high-pressure fluid") into a section of a wellbore that is pressure isolated by the respective spaced-apart upper and lower packer elements when the respective packer elements are in a packer set condition. It should be understood that the slotted frac hub may be replaced with a frac hub having ports, nozzles, or the like as a matter of design choice. As used in this document "slotted frac hub" means a frac hub having a central passage and radial fluid paths (slots, ports or nozzles) that provide fluid communication from the central passage through a sidewall of the frac hub.

In the packer set condition the respective upper and lower packer elements are in high-pressure sealing contact with the wellbore. The respective upper and lower packer elements are compressed to the packer set condition by a pressure cylinder that is activated by the high-pressure fluid pumped through a tubing string connected to the straddle packer. In one embodiment, the pressure cylinder is a modular pressure cylinder is assembled from a plurality of identical, interconnected pressure cylinder modules. The pressure cylinder is isolated from proppant in the high-pressure fluid by a proppant filtration plug body. In one embodiment, the proppant filtration plug body is supported by a downhole end of the slotted frac hub. The proppant filtration plug body may be supported anywhere in a central passage of the straddle packer downhole of the slotted frac hub fluid passages and uphole of pressure cylinder fluid ports. Filtered high-pressure fluid pumped through the tubing string enters respective cylinder chambers via respective pressure cylinder fluid ports in piston coupling sleeves. The filtered high-pressure fluid urges the pistons and cylinder walls in opposite directions along an axis of an active mandrel component of the pressure cylinder, which simultaneously compresses the upper and lower packer elements to the packer set condition. As the pistons move in the piston chambers, fluid in an annulus of the well bore is drawn into the modular cylinder through respective groups of pressure equalization ports having respective filtration sleeve bodies that inhibit an entry into the pressure cylinder of proppant in the annulus of the well bore.

A velocity bypass valve 84 on a downhole end of the straddle packer permits filtered fluid to flow through the velocity bypass valve 84 and out through fluid ports so long as a pump rate of the fluid remains at or below a predetermined threshold. This permits the tool to rapidly depressurize and return to the run-in condition once high-pressure fluid pumping into the straddle packer has been terminated, and assists in clearing proppant surrounding the straddle packer in the event of a screen out, minimizing a probability that the straddle packer might become "stuck in the hole".

| Part No. | Part Description |
|---|---|
| 10 | Straddle packer |
| 11 | Multicomponent mandrel |
| 12 | Completion string connection component |
| 13 | Multicomponent mandrel central passage |
| 14 | Completion string connection |
| 15 | Upper packer element compression shoulder |
| 16 | Upper packer element sleeve |
| 18 | Upper packer element |
| 20 | Upper compression bell |
| 21 | Upper compression bell pressure equalization ports |
| 22 | Upper mandrel tube |
| 23 | Upper packer element compression ring |
| 24 | Upper sliding sleeve |
| 26 | Upper sliding sleeve coupling |
| 27 | Slotted sliding sleeve female coupling end |
| 28 | Slotted sliding sleeve |
| 29 | Slotted sliding sleeve fingers |
| 30 | Slotted frac hub |
| 31 | Slotted frac hub grooves |
| 32 | Slotted frac hub slots |

-continued

| Part No. | Part Description |
|---|---|
| 33 | Anti-preset floating ring |
| 34 | Lower sliding sleeve coupling |
| 35 | Proppant filtration plug body |
| 35c | Proppant filtration plug body sintered metal core |
| 35a | Proppant filtration plug body-alternate embodiment |
| 35ac | Proppant filtration plug body sintered metal core-alternate |
| 35rn | Proppant filtration plug body retainer nut |
| 36 | Lower sliding sleeve |
| 38 | Slotted sliding sleeve captured end coupling ring |
| 42 | Lower mandrel tube |
| 44 | Mandrel tube crossover component |
| 46 | Active mandrel tube components |
| 47 | Inactive mandrel tube component |
| 48 | Modular pressure cylinder |
| 50 | Sleeve/cylinder crossover |
| 51 | Crossover pressure equalization ports |
| 51sf | Crossover pressure equalization port sleeve filter |
| 52 | Pressure cylinder pressure equalization ports |
| 52sf | Pressure cylinder pressure equalization port sleeve filters |
| 54 | Pressure cylinder modules |
| 55 | Pressure cylinder walls |
| 56 | Pressure pistons |
| 57 | Pressure cylinder fluid ports |
| 59 | Pressure cylinder chambers |
| 62 | Pressure cylinder crossover sleeve |
| 64 | Lower compression bell |
| 66 | Lower compression bell equalization ports |
| 66sf | Lower compression bell equalization port sleeve filter |
| 72 | Lower packer element mandrel sleeve component |
| 74 | Lower packer element |
| 76 | Lower crossover sub |
| 78 | Lower packer element compression shoulder |
| 80 | Lower crossover sub male connector |
| 82 | Velocity bypass sub |
| 84 | Velocity bypass valve |
| 85a | Velocity bypass sub connector end |
| 85b | Velocity bypass sub valve end |
| 88 | Velocity bypass valve ports |
| 90 | Velocity bypass valve spring |
| 92 | Velocity bypass valve jet nozzle |
| 96 | Lower end cap |

FIG. 1 is a perspective view of one embodiment of the straddle packer 10 with fluid pressure packer set for proppant-laden fracturing fluids in accordance with the invention in the run-in condition. The straddle packer 10 has a multicomponent mandrel 11, the majority of which can only be seen in a cross-sectional view (see FIG. 2). The multi-component mandrel 11 extends from the uphole end to the downhole end of the straddle packer 10. On the uphole end of the multicomponent mandrel 11, a completion string connection component 12 includes a completion string connection 14 (best seen in FIG. 2). A configuration of the completion string connection 14 is a matter of design choice and dependent on whether the straddle packer 10 is to be operated using a coil tubing string (not shown) or jointed tubing string (not shown), as is well understood in the art.

The completion string connection component 12 has an upper packer element compression shoulder 15 and an upper packer element sleeve 16 (see FIG. 2) that supports an elastomeric upper packer element 18, the function of which is explained in Applicant's above-referenced co-pending patent application. On a downhole side of the upper packer element 18 is an upper compression bell 20 having upper compression bell equalization ports 21, and an upper packer element compression ring 23 for compressing the upper packer element 18. The upper compression bell 20 slides the upper packer element compression ring 23 over the upper element packer sleeve 16. An upper sliding sleeve 24 is connected to a downhole side of the upper compression bell 20. The upper sliding sleeve 24 is connected to an upper sliding sleeve coupling 26, which is in turn connected to a female coupling end 27 of a slotted sliding sleeve 28. In one embodiment, the slotted sliding sleeve 28 has three slotted sliding sleeve finger components 29. In this embodiment, the slotted sliding sleeve finger components 29 define three slots that respectively expose a slotted frac hub slot 32 of a slotted frac hub 30. It should be understood the number of slotted sliding sleeve finger components 29 and frac hub slots 32 is a matter of design choice. An anti-preset floating ring 33, having the same external shape as the slotted frac hub 30, is received in the slotted sliding sleeve 28 and reciprocates in a limited range on the multiple component mandrel 11. The anti-preset floating ring 33 permits the straddle packer 10 to be suspended in a vertical orientation without compressing the upper packer element 18 or a lower packer element 74. It therefore inhibits pre-set when the straddle packer 10 is run into a vertical well bore or is being pushed through a deviated well bore.

A down hole end of the sliding sleeve finger components 29 are threadedly connected to a slotted sliding sleeve captured end coupling ring 38 that surrounds a lower sliding sleeve coupling 34 (see FIG. 2) that is threadedly connected to a lower sliding sleeve 36. A downhole end of the lower sliding sleeve 36 is connected to a sleeve/cylinder crossover 50 having a group of crossover pressure equalization ports 51 and a crossover pressure equalization sleeve filter 51sf (see FIG. 2) to inhibit a migration of well bore debris into the sleeve/cylinder crossover 50. The sleeve/cylinder crossover 50 is in turn connected to a modular pressure cylinder 48 assembled by interconnecting a plurality of pressure cylinder modules 54, respectively having a respective group of pressure cylinder pressure equalization ports 52. The modular pressure cylinder 48 is connected to a lower compression bell 64 having a group of lower compression bell pressure equalization ports 66. The lower compression bell 64 slides over a lower packer element mandrel sleeve component 72 (see FIG. 2) of the multicomponent mandrel 11, which supports an elastomeric lower packer element 74. Connected to the lower packer element mandrel sleeve component 72 is a lower crossover sub 76 having a lower packer element compression shoulder 78. In this embodiment a velocity bypass sub 82, described in detail in Applicant's above-referenced co-pending United States patent application, is connected to a downhole side of the lower crossover sub 76. The velocity bypass sub 82 has a velocity bypass valve 84 that supports a velocity bypass valve jet nozzle 92 that lets fluid pass therethrough at a predetermined rate. A velocity bypass valve spring 90 urges the velocity bypass valve 84 to a normally open position in which a plurality of velocity bypass valve ports 88 let fluid flow out of the central passage 13. When a predetermined fluid pump rate is exceeded, the bias of the velocity bypass spring 90 is overcome and the velocity bypass valve 84 closes the velocity bypass valve ports 88. A lower end cap 96, which caps the downhole end of the multicomponent mandrel 11, is connected to a downhole end of the velocity bypass sub 82.

Figure 2:
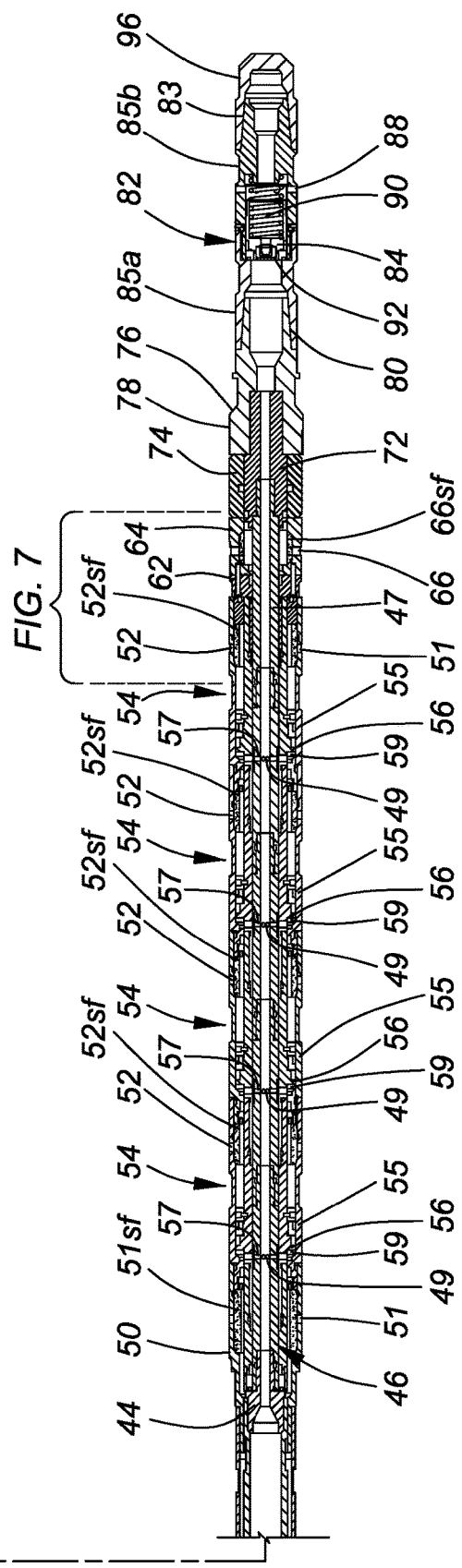
FIG. 2 is a cross-sectional view of the straddle packer shown in FIG. 1, in the run-in condition.
Figure 3:
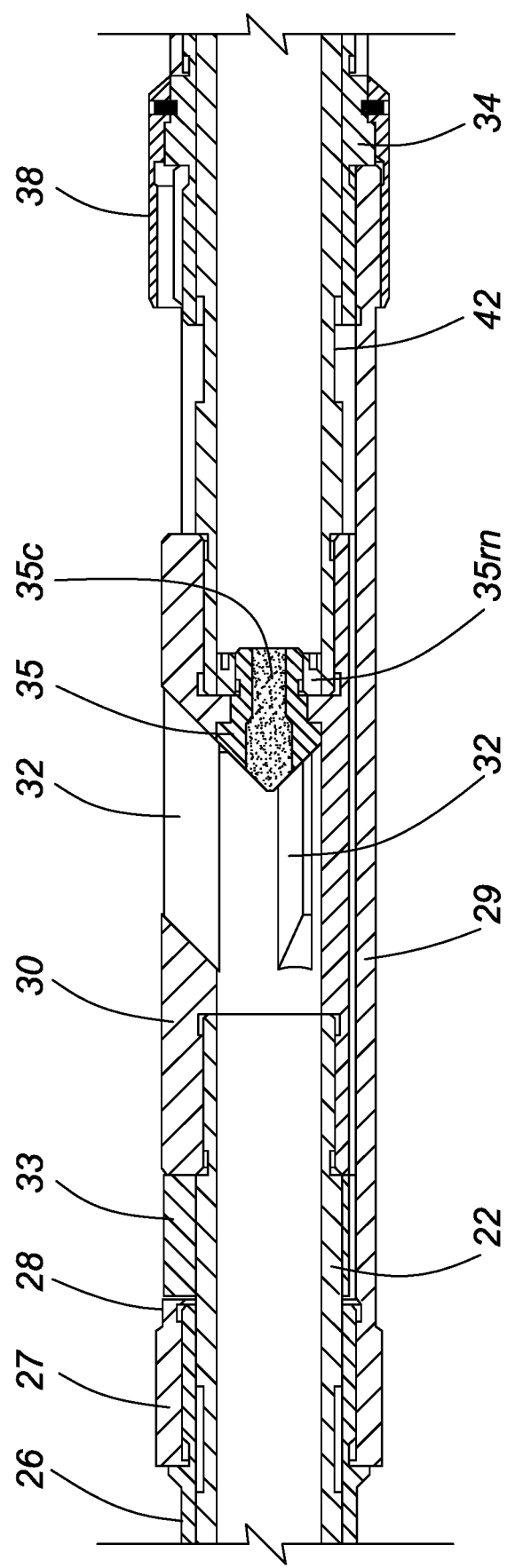

FIG. 2 is a cross-sectional view of the straddle packer 10 shown in FIG. 1 in the run-in condition in which the upper packer element 18 and the lower packer element 74 are in a relaxed, unset condition suitable for moving the straddle packer 10 to a desired location in a well bore. As explained above, the slotted sliding sleeve 28 is connected to the lower sliding sleeve 36 by the lower sliding sleeve coupling 34, which is threadedly connected to both the slotted sliding sleeve 28 and the lower sliding sleeve 36. The slotted sliding sleeve captured end coupling ring 38 that covers the lower sliding sleeve coupling 34 is likewise threadedly connected to the slotted sliding sleeve 28.

As also explained above, the elastomeric upper packer element 18 is supported on the upper packer element sleeve 16 of the completion string connection component 12 of the multicomponent mandrel 11. The multicomponent mandrel 11 has a central passage 13 that provides a fluid path through an entire length of the multicomponent mandrel 11. The multicomponent mandrel 11 includes the following interconnected components: the completion string connection component 12, which is threadedly connected to an upper mandrel tube 22; the slotted frac hub 30 connected to a downhole end of upper mandrel tube 22; a lower mandrel tube 42 connected to a downhole end of the slotted frac hub 30; a mandrel tube crossover component 44 connected to a downhole end of the lower mandrel tube 42; interconnected active mandrel tube components 46 that support the respective modular pressure cylinder modules 54 are connected to a downhole end of the mandrel tube crossover component 44; the lower packer element mandrel sleeve component 72 connected to an inactive mandrel tube component 47, which is connected to a downhole end of the last active mandrel tube component 46; the lower crossover sub 76 connected to the downhole end of the lower packer element mandrel sleeve component 72; and the velocity bypass sub 82 connected on a velocity bypass sub connector end 85a to a lower crossover sub male connector 80 of the lower crossover sub 76.

In one embodiment the velocity bypass sub 82 has a threaded downhole end 83 on a velocity bypass sub valve end 85b to permit the connection of another downhole tool or, in this embodiment, the lower end cap 96 that caps the central passage 13 of the multicomponent mandrel 11 and prevents debris from entering the velocity bypass sub 82 and the central passage 13 if the straddle packer 10 is run into a downhole proppant plug, or other debris in a wellbore.

The active mandrel tube components 46 collectively slidably support the respective pressure cylinder modules 54 of the modular pressure cylinder 48. As explained above, the number of pressure cylinder modules used in the straddle packer 10 is a matter of design choice, but four modules have been found to be appropriate for many applications. If the number of pressure cylinder modules is changed, the number of the active mandrel tube components 46 is also correspondingly changed, as will be readily understood by those skilled in the art. In this embodiment, the active mandrel tube components 46 respectively have pressure cylinder fluid ports (collectively 57) that provide fluid communication between the central passage 13 and a pressure cylinder chamber 59 of each of the respective pressure cylinder modules 54.

In this embodiment, each of the pressure cylinder modules 54 are identical and each pressure cylinder module 54 respectively includes the following components: a pressure cylinder wall 55; a pressure piston 56; each pressure piston 56 reciprocates within the pressure cylinder chamber 59. The pressure cylinder fluid ports 57 let the high-pressure fluid flow into the respective pressure cylinder chambers 59; respective groups of pressure cylinder pressure equalization ports 52 in the respective pressure cylinder walls 55 equalize pressure behind the respective pressure pistons 56 with ambient wellbore pressure. The pressure cylinder pressure equalization port sleeve filters 52sf exclude wellbore proppant from the modular pressure cylinder 48.

A pressure cylinder crossover sleeve 62 caps the last pressure cylinder module 54. The pressure cylinder crossover sleeve 62 is connected to the lower compression bell 64 having the group of lower compression bell pressure equalization ports 66. A lower compression bell pressure equalization port sleeve filter 66sf inhibits migration of wellbore debris into the lower compression bell 64 through the group of lower compression bell pressure equalization ports 66.

When proppant-laden high-pressure fluid is pumped into the straddle packer 10, a proppant filtration plug body 35 supported in a lower end of the slotted frac hub 30 excludes proppant from the central passage 13 downhole of the slotted frac hub 30, while permitting fluid components of the high-pressure fluid to flow therethrough. In one embodiment, the proppant filtration plug body is a 3-D printed body with a sintered metal core, as will be explained in more detail with reference to FIGS. 3, 5, 6A and 6B. The proppant-free fluid that flows through the proppant filtration plug body 35 activates the modular pressure cylinder 48. The modular pressure cylinder 48 simultaneously compresses the upper packer element 18 and the lower packer element 74 to isolate a section of the wellbore between the two packer elements 18, 74 after the velocity bypass valve 84 closes when the pump rate exceeds the velocity bypass threshold, as explained in detail in Applicant's above-referenced co-pending United States patent application, which explains in detail the operation and function of the modular pressure cylinder 48.

Figure 3:
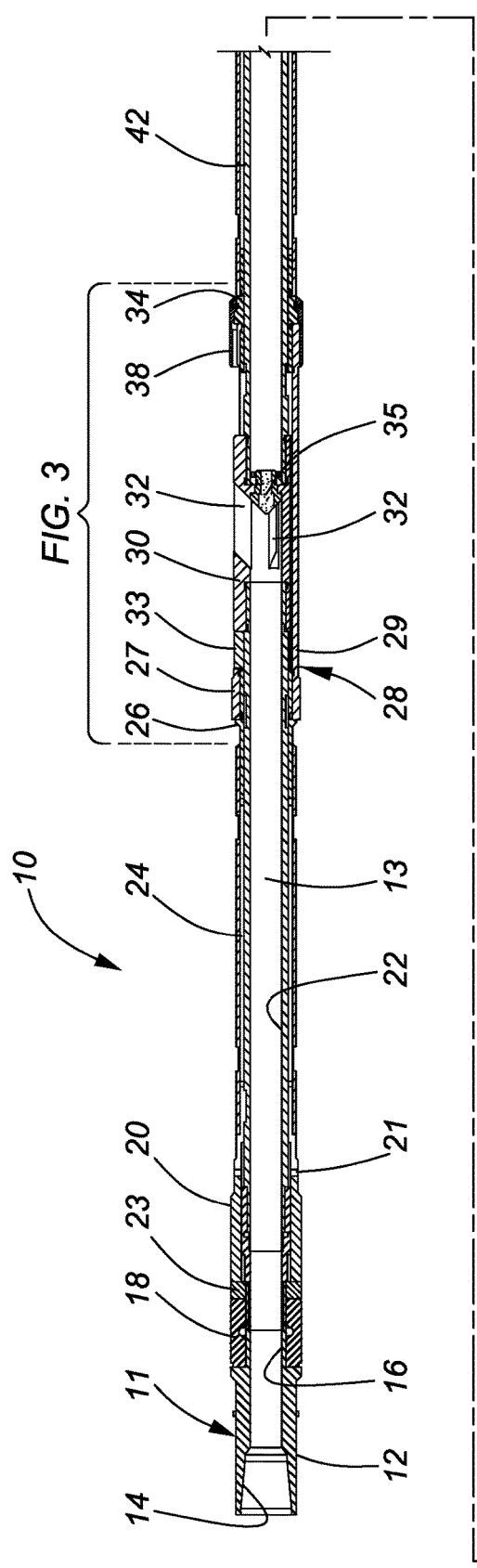
FIG. 3 is a cross-sectional view taken between lines labeled "FIG. 3" of the straddle packer shown in FIG. 2.

FIG. 3 is a cross-sectional view taken between lines labeled "FIG. 3" of the straddle packer shown in FIG. 2. As can be seen, the proppant filtration plug body 35 has a proppant filtration plug body sintered metal core 35c that permits fluid components of the high-pressure fluid to flow through the proppant filtration plug body 35, but excludes solid components and diverts excluded solid components through the slotted frac hub slots 32. In one embodiment, the sintered metal core 35c is 3D-printed. A filtration plug body retainer nut 35m retains the proppant filtration plug body 35 in the downhole end of the slotted frac hub 30.

Figure 4:
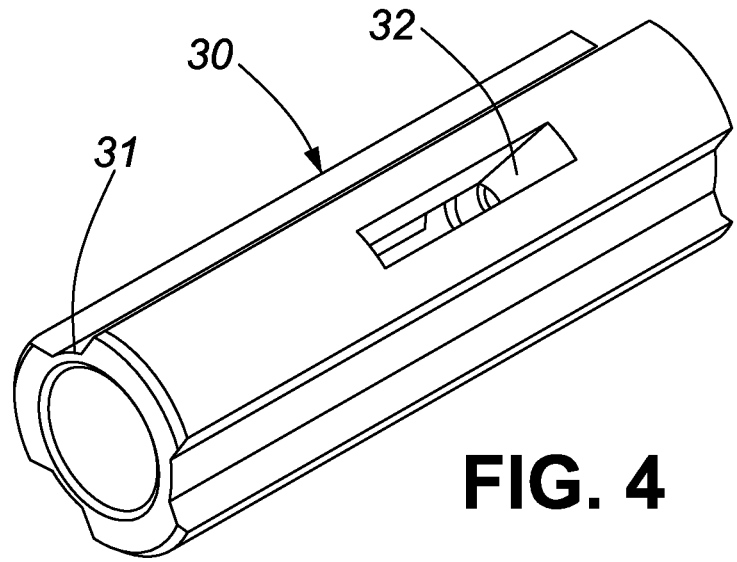
FIG. 4 is a perspective view of a slotted frac hub shown in FIG. 3.

FIG. 4 is a perspective view of a slotted frac hub shown in FIG. 3. In this embodiment, the slotted frac hub 30 includes three slotted frac hub grooves 31 that respectively receive one of the slotted sliding sleeve fingers 29 (see FIG. 1). As explained above, the number of slotted frac hub slots 32, and hence the number of slotted frac hub grooves 31 is a matter of design choice. As will be understood by those skilled in the art, the slotted frac hub 30 may also have more than one slotted frac hub slot 32 between each slotted frac hub groove 31.

Figure 5:
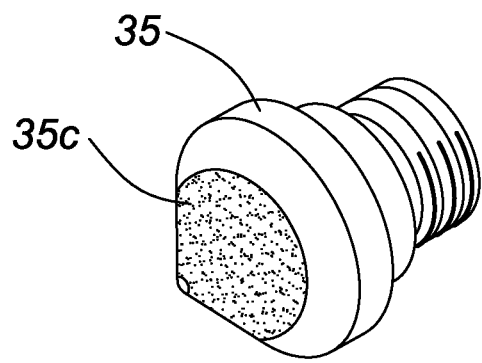
FIG. 5 is a perspective view of one embodiment of a proppant filter body retained by the slotted frac hub shown in FIGS. 3 and 4.

FIG. 5 is a perspective view of one embodiment of a proppant filtration plug body retained by the slotted frac hub 30 shown in FIGS. 3 and 4. In this embodiment, the proppant filtration plug body 35 has a frusta-conical uphole end.

Figure 6A:
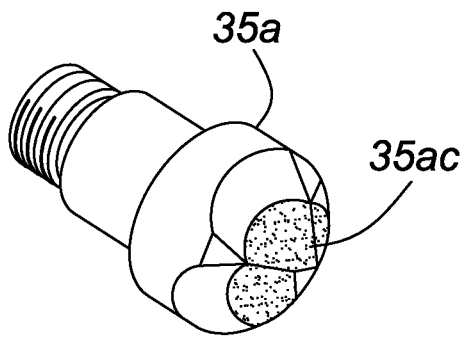
FIG. 6a is a perspective view of another embodiment of a proppant filter body retained by the slotted frac hub shown in FIGS. 3 and 4.

FIG. 6a is a perspective view of another embodiment of a proppant filtration plug body 35a with a sintered metal core 35ac retained by the slotted frac hub 30 shown in FIGS. 3 and 4. In this embodiment, the proppant filtration plug body 35a has three circum-inclined flat surfaces that respectively divert high-pressure fluid into the respective slotted frac hub slots 32. In one embodiment the sintered metal core 35ac is 3D-printed.

Figure 6B:
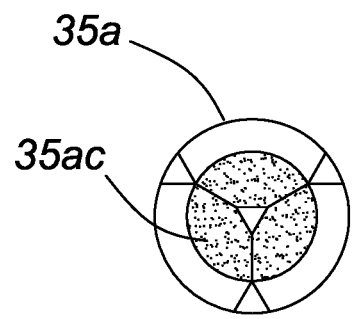

FIG. 6b is an uphole end view of the proppant filtration plug body 35a shown in FIG. 6a.

Figure 7:
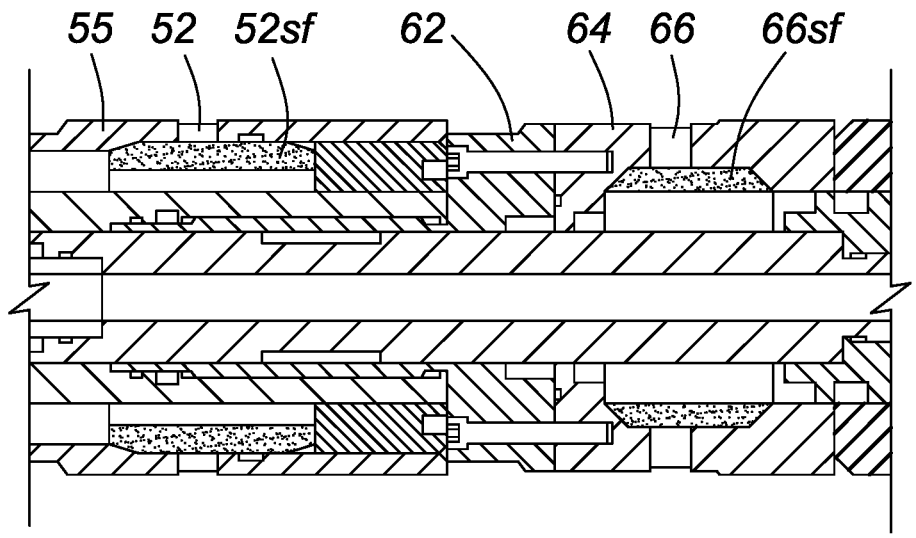
FIG. 7 is a cross-sectional view between lines labeled "FIG. 7" of the straddle packer shown in FIG. 2.

FIG. 7 is a cross-sectional view between lines labeled "FIG. 7" of the straddle packer shown in FIG. 2, providing an enlarged view of one pressure cylinder pressure equalization port sleeve filter 52sf and the lower compression bell sleeve filter 66sf. In one embodiment, each of these sleeve filters 51sf, 52sf and 66sf are 3D printed sintered metal bodies. As understood by those skilled in the art, other sintered metal forming or casting techniques may also be used to create the respective sleeve filters 51sf, 52sf and 66sf.

Figure 8A:
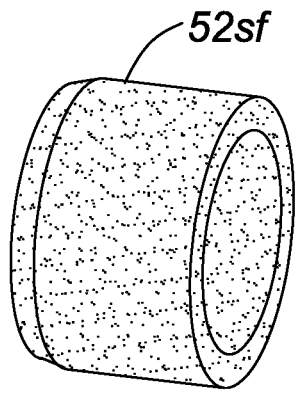
FIG. 8a is a perspective view of one embodiment of a pressure cylinder pressure equalization port sleeve filter of the straddle packer shown in FIG. 2.
Figure 8B:
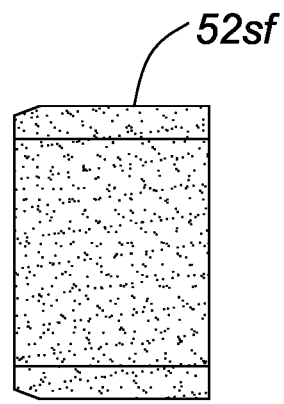

FIG. 8a is a perspective view of one embodiment of a pressure cylinder pressure equalization port sleeve filter 52sf of the straddle packer 10 shown in FIG. 2, and FIG. 8B is a cross-sectional view of the pressure cylinder pressure equalization port sleeve filter 52sf shown in FIG. 8a.

Figure 9A:
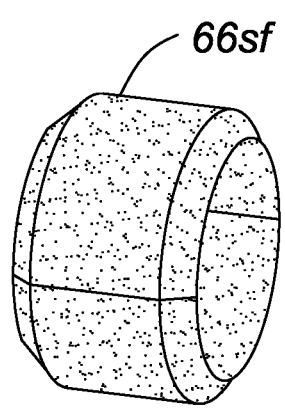
FIG. 9a is a perspective view of one embodiment of a compression bell pressure equalization sleeve filter of the straddle packer shown in FIG. 2.
Figure 9B:
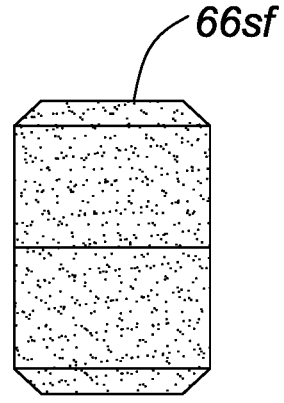

FIG. 9a is a perspective view of one embodiment of a compression bell pressure equalization sleeve filter 66fs of the straddle packer 10 shown in FIG. 2. Due to the shape of the receiving cavity in the lower compression bell 64 (see FIG. 7) in this embodiment, the compression bell pressure equalization sleeve filter 66fs is axially bifurcated to facilitate insertion into the lower compression bell 64. FIG. 9b is a cross-sectional view of the filter body shown in FIG. 9a.

The explicit embodiments of the invention described above have been presented by way of example only. The scope of the invention is therefore intended to be limited solely by the scope of the appended claims.

We claim:

1. A straddle packer with fluid pressure packer set for proppant-laden fracturing fluids, comprising a proppant filtration plug body with a sintered core that occludes a central passage of the straddle packer downhole of radial fluid paths in a frac sub of the straddle packer and uphole of fluid ports of a pressure cylinder of the straddle packer, the proppant filtration plug body being adapted to permit only fluid components of the proppant-laden fracturing fluids to flow therethrough.

2. The straddle packer as claimed in claim 1 wherein the proppant filtration body is supported by the frac sub.

3. The straddle packer as claimed in claim 2 wherein the proppant filtration plug body has an uphole end adapted to divert the solid components of the high-pressure fluid into the radial fluid paths through the frac sub.

4. The straddle packer as claimed in claim 2 wherein the radial fluid paths through the frac sub comprise frac sub slots and the proppant filtration plug body has a circum-inclined flat surface for each of the frac sub slots, each circum-inclined flat surface being adapted to divert the solid components of the high-pressure fluid into a corresponding one of the frac sub slots.

5. The straddle packer as claimed in claim 2 wherein the proppant filtration plug body comprises a threaded end with a threaded retainer nut that retains the proppant filtration plug body in a downhole end of the frac hub.

6. The straddle packer as claimed in claim 1 wherein the proppant filtration plug body has a 3D-printed sintered core.

7. The straddle packer as claimed in claim 1 wherein the pressure cylinder comprises a modular pressure cylinder for setting spaced-apart packer elements of the straddle packer, the modular pressure cylinder comprising a plurality of interconnected pressure cylinder modules.

8. The straddle packer as claimed in claim 1 comprising pressure equalization sleeve filters adapted to inhibit an ingress of solids from a well bore through respective groups of pressure equalization ports in the straddle packer.

9. The straddle packer as claimed in claim 8 wherein the respective pressure equalization port sleeve filters comprise 3D-printed filters.

10. A straddle packer with fluid pressure packer set for proppant-laden fracturing fluids, comprising a slotted frac hub having a central passage and at least one frac hub slot in fluid communication with the central passage, the slotted frac hub supporting a proppant filtration plug body with a sintered core that occludes the central passage downhole of the at least one frac hub slot, the proppant filtration plug body being adapted to permit only fluid components of the fracturing fluids to flow therethrough.

11. The straddle packer as claimed in claim 10 wherein the proppant filtration plug body has an uphole end that is adapted to divert solid components of the fracturing fluids into the at least one frac hub slot.

12. The straddle packer as claimed in claim 10 wherein the proppant filtration plug body has a circum-inclined flat surface for each frac hub slot.

13. The straddle packer as claimed in claim 12 wherein the proppant filtration plug body has a sintered core.

14. The straddle packer as claimed in claim 10 wherein the proppant filtration plug body has a threaded downhole end and is retained in a downhole end of the slotted frac hub by a threaded retainer nut that engages the threaded downhole end.

15. The straddle packer as claimed in claim 10 further comprising a modular pressure cylinder for setting spaced-apart packer elements of the straddle packer, the modular pressure cylinder comprising a plurality of interconnected pressure cylinder modules, each pressure cylinder module comprising a group of pressure cylinder pressure equalization ports and a pressure equalization port sleeve filter adapted to inhibit an ingress of solids from an annulus of a well bore in which the straddle packer is set.

16. The straddle packer as claimed in claim 10 wherein the straddle packer comprises a plurality of groups of spaced-apart pressure equalization ports, each group of pressure equalization ports comprising a pressure equalization sleeve filter adapted to inhibit an ingress of solids from a well bore through respective ones of the pressure equalization ports in each group of pressure equalization ports.

17. The straddle packer as claimed in claim 16 wherein the respective pressure equalization port sleeve filters comprise sintered metal bodies.

18. The straddle packer as claimed in claim 17 wherein the respective pressure equalization port sleeve filters are axially bifurcated.

19. A straddle packer with fluid pressure packer set for proppant-laden fracturing fluids, comprising a proppant filtration plug body fixedly supported in a downhole end of a frac sub of the straddle packer, the proppant filtration plug body being adapted to occlude a central passage of the straddle packer downhole of the frac sub and to permit only fluid components of the proppant-laden fracturing fluids to flow into the central passage downhole of the frac sub.

20. The straddle packer with fluid pressure packer set for proppant-laden fracturing fluids as claimed in claim 19 wherein the proppant filtration plug body comprises a metal body with a sintered metal core.

* * * * *